(12) United States Patent
Pandurangarao et al.

(10) Patent No.: US 11,893,387 B2
(45) Date of Patent: *Feb. 6, 2024

(54) SYSTEMS AND METHODS FOR SOFTWARE QUALITY PREDICTION

(71) Applicant: Allstate Insurance Company, Northbrook, IL (US)

(72) Inventors: Anil Kumar Pandurangarao, Buffalo Grove, IL (US); Daniel Pecoraro, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,457

(22) Filed: Apr. 15, 2022

(65) Prior Publication Data

US 2022/0318008 A1 Oct. 6, 2022

Related U.S. Application Data

(63) Continuation of application No. 16/860,242, filed on Apr. 28, 2020, now Pat. No. 11,334,351.

(51) Int. Cl.
*G06F 8/77* (2018.01)
*G06F 11/36* (2006.01)
(Continued)

(52) U.S. Cl.
CPC ............... *G06F 8/77* (2013.01); *G06F 8/75* (2013.01); *G06F 11/3616* (2013.01);
(Continued)

(58) Field of Classification Search
None
See application file for complete search history.

(56) References Cited

U.S. PATENT DOCUMENTS 8,843,882 B1 9/2014 Dejban et al.
9,176,729 B2 11/2015 Mockus et al.
(Continued)

FOREIGN PATENT DOCUMENTS

CN 108804323 A 11/2018
JP 2018018267 A 2/2018
(Continued)

OTHER PUBLICATIONS

Galin, Daniel, "Software Product Quality Metrics," IEEE, 2018, 29pg. (Year: 2018).*

(Continued)

*Primary Examiner* — Ryan D. Coyer
(74) *Attorney, Agent, or Firm* — Dinsmore & Shohl LLP

(57) ABSTRACT

Systems and methods in accordance with embodiments of the invention can automatically track the creation of documents, such as source code files and unit tests, along with the development of those documents. A variety of metrics can be generated regarding errors and issues identified during the development process along with predictive metrics regarding potential issues within the documents. These metrics can be used to identify common issues, automatically generate proactive suggestions to avoid issues during document creation and testing, and/or generate developer profiles indicating the performance of particular developers. A variety of machine learning classifiers can be used to generate the metrics.

16 Claims, 6 Drawing Sheets

(51) Int. Cl.
  *G06N 5/04* (2023.01)
  *G06Q 10/067* (2023.01)
  *G06Q 10/0639* (2023.01)
  *G06N 20/00* (2019.01)
  *G06F 8/75* (2018.01)
(52) U.S. Cl.
  CPC ........... *G06F 11/3692* (2013.01); *G06N 5/04* (2013.01); *G06N 20/00* (2019.01); *G06Q 10/067* (2013.01); *G06Q 10/06395* (2013.01); *G06Q 10/06398* (2013.01)

(56) References Cited

U.S. PATENT DOCUMENTS

| | | |
|---|---|---|
| 9,430,359 B1 | 8/2016 | Troutman et al. |
| 9,542,176 B2 | 1/2017 | Bird et al. |
| 9,934,131 B2 | 4/2018 | Kalech et al. |
| 10,311,405 B2 | 6/2019 | Burton et al. |
| 10,354,210 B2 | 7/2019 | Kour et al. |
| 10,372,592 B2 | 8/2019 | Champlin-Scharff et al. |
| 10,423,410 B1 | 9/2019 | Goyal et al. |
| 10,482,000 B2 | 11/2019 | Vikjord et al. |
| 10,489,270 B2 | 11/2019 | Cheng et al. |
| 10,585,780 B2 | 3/2020 | Woulfe et al. |
| 2013/0311968 A1 | 11/2013 | Sharma |
| 2015/0178634 A1 | 6/2015 | Chen et al. |
| 2017/0212829 A1 | 7/2017 | Bales et al. |
| 2018/0150742 A1 | 5/2018 | Woulfe et al. |
| 2018/0276584 A1* | 9/2018 | Woulfe ............ G06Q 10/0635 |
| 2019/0095843 A1* | 3/2019 | Muthuswamy ........ G06F 40/30 |
| 2019/0287040 A1* | 9/2019 | Cohen ............. G06Q 10/06398 |
| 2019/0391904 A1 | 12/2019 | Sabharwal et al. |
| 2020/0097388 A1* | 3/2020 | Bhat .................. G06F 11/3608 |
| 2020/0272786 A1* | 8/2020 | Pandurangarao ..... G06F 18/217 |

FOREIGN PATENT DOCUMENTS

| | | |
|---|---|---|
| WO | 2019094933 A1 | 5/2019 |
| WO | 2020012196 A1 | 1/2020 |

OTHER PUBLICATIONS

Snipes et al., "Code Hot Spot: A Tool for Extraction and Analysis of Code Change History," IEEE, 2011, 10pg. (Year: 2011).*

Israt-Un-Nisa Uqaili et al, Machine Learning Based Prediction of Complex Bugs in Source Code, International Arab Journal of Information Technology, Mar. 2019.

Ashima Kukkar et al, A Novel Deep-Learning-Based Bug Severity Classification Technique Using Convolutional Neural Networks and Random Forest with Boosting, Sensors, Jul. 2019.

Ahmed Fawzi Otoom et al, Automated Labelling and Severity Prediction of Software Bug Reports, Int. J. Computational Science and Engineering, vol. 19, No. 3, 2019.

M. Chalapathi Rao et al, Assessment of Software Bug Complexity and Severity using Evolutionary SOM Scheme, International Journal of Engineering and Advanced Technology (IJEAT), ISSN: 2249-8958, vol. 8, Issue 6, Aug. 2019.

* cited by examiner

SYSTEMS AND METHODS FOR SOFTWARE QUALITY PREDICTION

TECHNICAL FIELD

Aspects of the invention relate to data processing and more specifically to the automated validation of software code using machine learning.

BACKGROUND

A variety of documents, such as the source code for computer programs, can be created by developers. Developers typically follow a set of procedures and standards set out by an organization to ensure that the documents are created and tested in a consistent, repeatable manner. The documents are typically manually reviewed by senior developers or managers in order to ensure the quality of the documents and to verify that the appropriate procedures have been followed. The review itself is often defined by review checklists, but many times the checklists are not followed by the developers or reviewers.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Systems and methods in accordance with embodiments of the invention can automatically track the creation of documents, such as source code files and unit tests, along with the development of those documents. A variety of metrics can be generated regarding errors and issues identified during the development process along with predictive metrics regarding potential issues within the documents. These metrics can be used to identify common issues, automatically generate proactive suggestions to avoid issues during document creation and testing, and/or generate developer profiles indicating the performance of particular developers. A variety of machine learning classifiers can be used to generate the metrics.

The arrangements described can also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
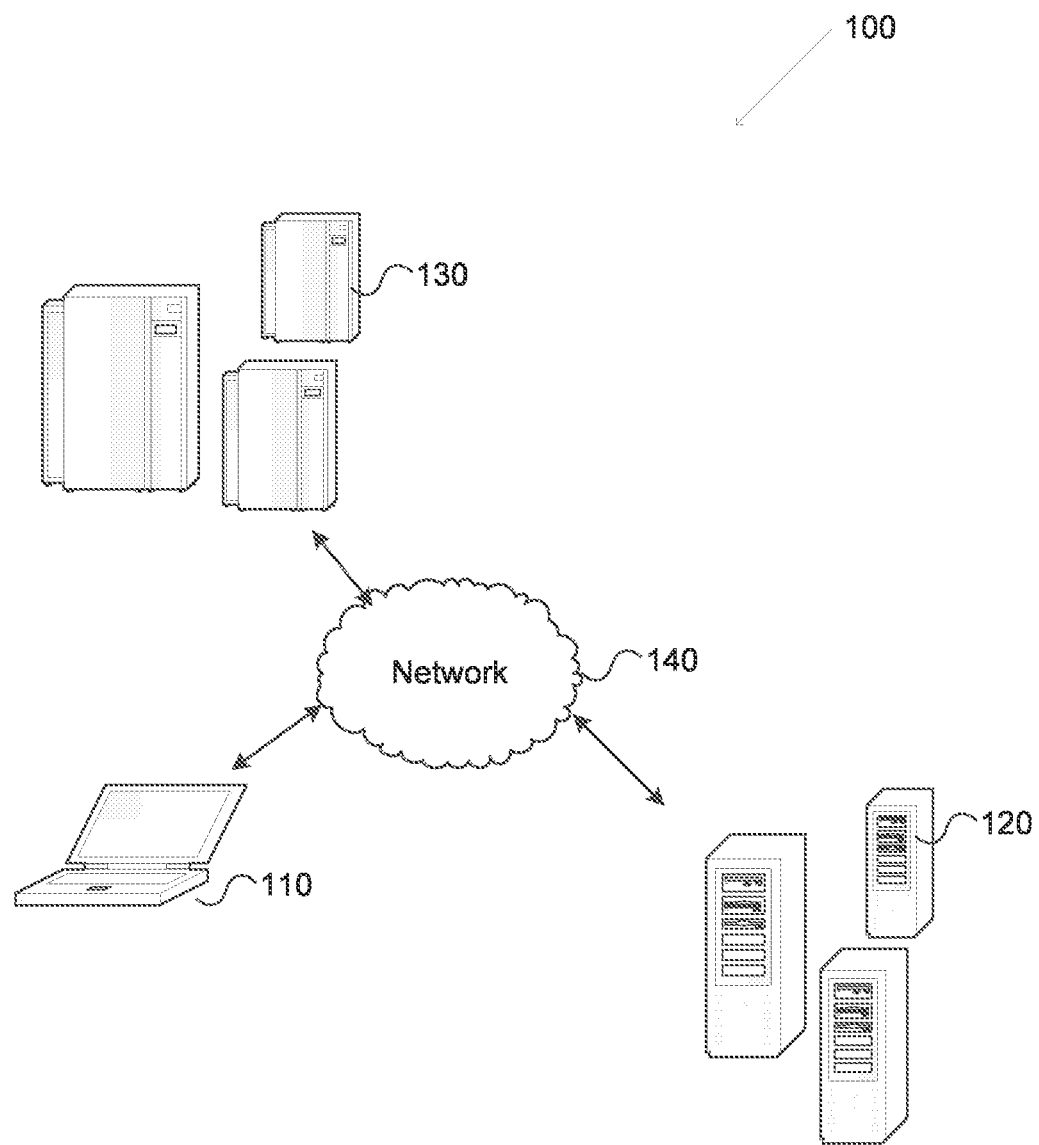
FIG. 1 illustrates an example operating environment in which one or more aspects described herein can be implemented.

In the following description of the various embodiments, reference is made to the accompanying drawings, which form a part hereof, and in which is shown by way of illustration, various embodiments of the disclosure that can be practiced. It is to be understood that other embodiments can be utilized.

Aspects of the disclosure relate to computer hardware and software. In particular, aspects described herein relate to recording, monitoring, and/or governing document quality governance standards. Developing documents, such as software source code, is typically an expensive and time-consuming process. Errors made during development can result in poorly performing software, cost overruns, and delays. The typical source code file development lifecycle includes a mix of manual processes, such as code review and walkthroughs, and post source code file creation tools, such as testing suites and tools that analyze source code files to flag errors, bugs, and stylistic issues. These processes and tools are typically performed after a source code file is merged into a source code repository, such as a version control system. A variety of problems exist with this approach as it is most likely an afterthought and addresses only stylistic and test coverage aspects of the source code files and does not address potential issues that can arise during the development process. For example, particular source code files can be responsible for a large number of bugs and/or errors within a project. These source code files can be subject to frequent revision to correct these errors. Identifying those source code files that receive frequent revisions can indicate portions of a project that should be more carefully reviewed and/or assigned to high performing developers to correct existing issues and avoid potential future issues.

These and various other arrangements will be described more fully herein. As will be appreciated by one of skill in the art upon reading the following disclosure, various aspects described herein can be embodied as a method, a computer system, or a computer program product. Accordingly, those aspects can take the form of an entirely hardware embodiment, an entirely software embodiment, or an embodiment combining software and hardware aspects. Furthermore, such aspects can take the form of a computer program product stored by one or more computer-readable storage media having computer-readable program code, or instructions, embodied in or on the storage media. Any suitable computer-readable storage media can be utilized, including hard disks, CD-ROMs, optical storage devices, magnetic storage devices, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space.

Operating Environments and Computing Devices

FIG. 1 illustrates an operating environment 100 in accordance with an embodiment of the invention. The operating environment 100 includes at least one client device 110, at least one code analysis server system 120, and/or at least one database server system 130 in communication via a network 140. Any of the devices and systems described herein can be implemented, in whole or in part, using one or more computing systems described with respect to FIG. 2.

Client devices 110 can create a variety of source code repositories, provide source code files and/or metadata regarding those source code files to a database server system for storage, and/or provide feedback regarding source code files as described herein. Code analysis server systems 120 can obtain data captured via the client devices and process the data to generate developer ratings, identify common issues, and/or provide document metrics as described herein (e.g., using machine learning. Additionally, code analysis server systems 120 can train and/or provide machine classifiers to perform any of the processes described herein. Database server systems 130 can provide a source code repository for storing source code files and/or a bug tracking system for tracking metadata (such as bug reports, feature requests, and the like for particular source code files. Common databases can include, but are not limited to relational databases, distributed databases, any version control systems such as CVS, Subversion, GIT, ClearCase, Team Foundation Server, Visual SourceSafe, GNU arch, and/or a combination thereof. However, it should be noted that any of the client devices 110, code analysis server system 120, and/or database server systems 130 can perform some or all of any step of any process as described herein. The network 140 can include a local area network (LAN, a wide area network (WAN, a wireless telecommunications network, and/or any other communication network or combination thereof.

As discussed herein, the data transferred to and from various devices in the operating environment 100 can include secure and sensitive data, such as confidential documents, developer profiles, and/or procedures for developing source code files. Therefore, it can be desirable to protect transmissions of such data using secure network protocols and encryption, and/or to protect the integrity of the data when stored on the various computing devices within the operating environment 100. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP, Secure File Transfer Protocol (SFTP, and/or Pretty Good Privacy (PGP encryption. In many embodiments, one or more web services can be implemented within the various computing devices. Web services can be accessed by authorized external devices and users to support input, extraction, and manipulation of data between the various computing devices in the operating environment 100. Web services built to support a personalized display system can be cross-domain and/or cross-platform, and can be built for enterprise use. Such web services can be developed in accordance with various web service standards, such as the Web Service Interoperability (WS-I guidelines. Data can be transmitted using the Secure Sockets Layer (SSL or Transport Layer Security (TLS protocol to provide secure connections between the computing devices. Web services can be implemented using the WS-Security standard, which provides for secure SOAP messages using XML encryption. Specialized hardware can be used to provide secure web services. For example, secure network appliances can include built-in features such as hardware-accelerated SSL and HTTPS, WS-Security, and/or firewalls. Such specialized hardware can be installed and configured in the operating environment 100 in front of one or more computing devices such that any external devices can communicate directly with the specialized hardware.

It will be appreciated that the network connections shown are illustrative and other means of establishing a communications link between the computers can be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein can be configured to communicate using any of these network protocols or technologies.

Figure 2:
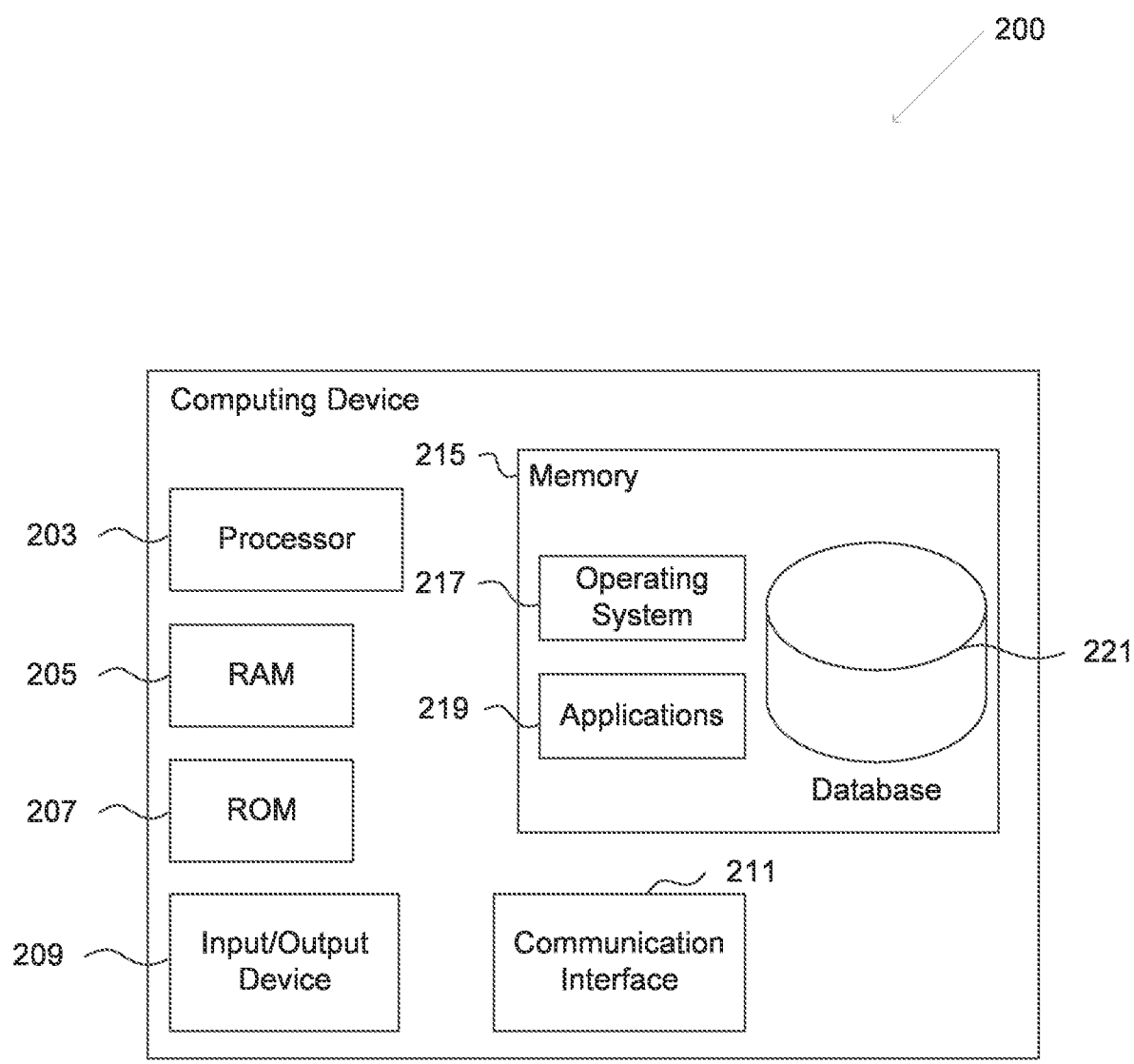
FIG. 2 illustrates an example computing device in accordance with one or more aspects described herein.

Turning now to FIG. 2, a computing device 200 in accordance with an embodiment of the invention is shown. The computing device 200 can include a processor 203 for controlling overall operation of the computing device 200 and its associated components, including RAM 205, ROM 207, input/output device 209, communication interface 211, and/or memory 215. A data bus can interconnect processor(s 203, RAM 205, ROM 207, memory 215, I/O device 209, and/or communication interface 211. Communication interface 211 can include one or more transceivers, digital signal processors, and/or additional circuitry and software for communicating via any network, wired or wireless, using any protocol including those described herein.

Input/output (I/O device 209 can include a microphone, keypad, touch screen, and/or stylus through which a user of the computing device 200 can provide input, and can also include one or more of a speaker for providing audio output and a video display device for providing textual, audiovisual, and/or graphical output, Software can be stored within memory 215 to provide instructions to processor 203 allowing computing device 200 to perform various actions. For example, memory 215 can store software used by the computing device 200, such as an operating system 217, application programs 219, and/or an associated internal database 221. The various hardware memory units in memory 215 can include volatile and nonvolatile, removable and non-removable media implemented in any method or technology for storage of information such as computer-readable instructions, data structures, program modules, or other data, Memory 215 can include one or more physical persistent memory devices and/or one or more non-persistent memory devices. Memory 215 can include, but is not limited to, random access memory (RAM 205, read only memory (ROM 207, electronically erasable programmable read only memory (EEPROM, flash memory or other memory technology, CD-ROM, digital versatile disks (DVD or other optical disk storage, magnetic cassettes, magnetic tape, magnetic disk storage or other magnetic storage devices, or any other medium that can be used to store the desired information and that can be accessed by processor 203.

Processor 203 can include a single central processing unit (CPU, which can be a single-core or multi-core processor (e.g., dual-core, quad-core, etc., or can include multiple CPUs. Processor(s 203 and associated components can allow the computing device 200 to execute a series of computer-readable instructions to perform some or all of the processes described herein. Although not shown in FIG. 2, various elements within memory 215 or other components in computing device 200, can include one or more caches, for example, CPU caches used by the processor 203, page caches used by the operating system 217, disk caches of a hard drive, and/or database caches used to cache content from database 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations, such as faster response times and less dependence on network conditions when transmitting and receiving data.

Although various components of computing device 200 are described separately, functionality of the various components can be combined and/or performed by a single component and/or multiple computing devices in communication without departing from the invention.

Predicting Code Quality

Figure 3:
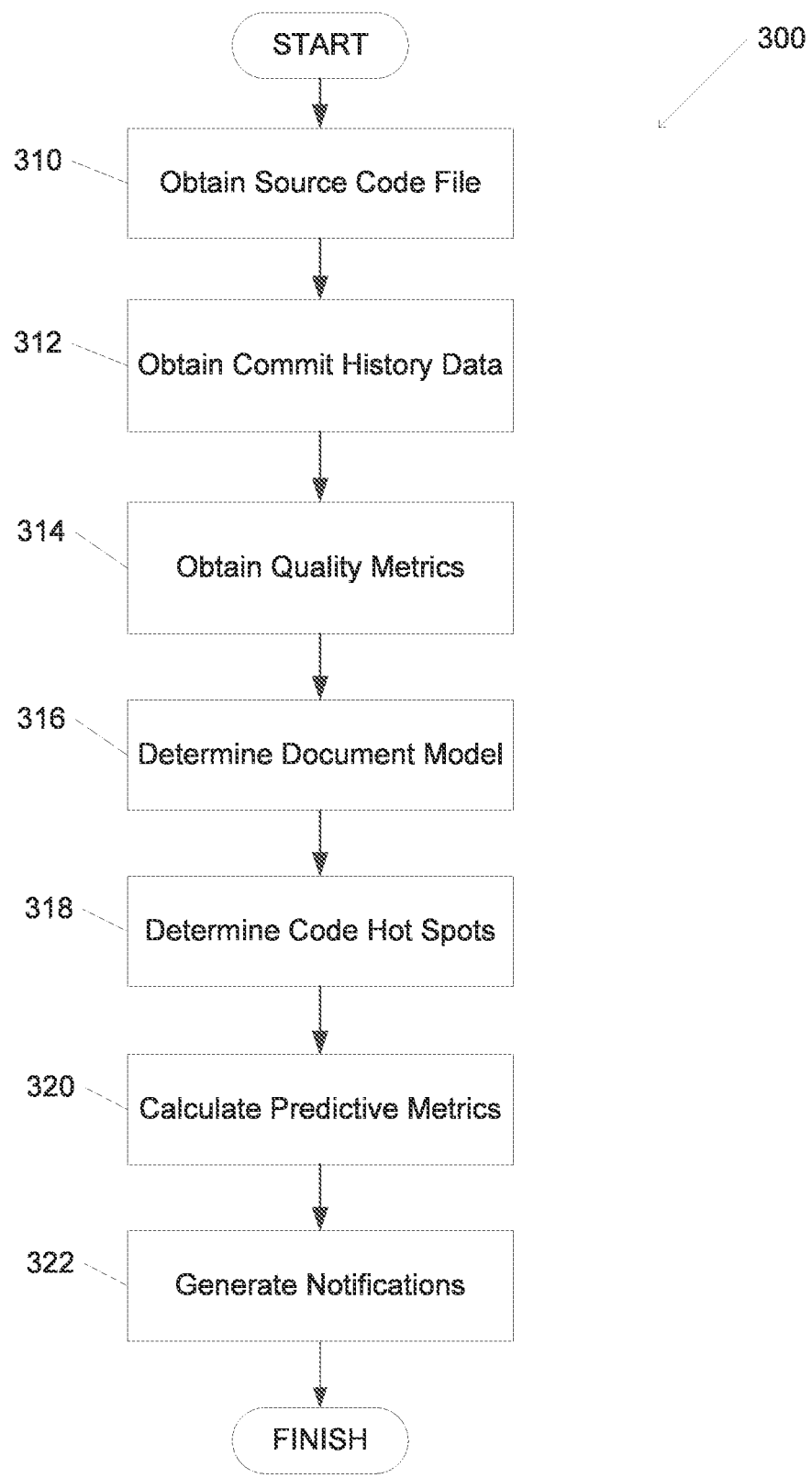
FIG. 3 is a flow chart conceptually illustrating a process for identifying hot spots in a source code repository in accordance with one or more aspects described herein.

FIG. 3 is a flow chart conceptually illustrating a process for identifying hot spots in a source code repository in accordance with one or more aspects described herein. Some or all of the steps of process 300 may be performed using one or more computing devices as described herein. In a variety of embodiments, some or all of the steps described below may be combined and/or divided into sub-steps as appropriate.

At step 310, source code files can be obtained. Source code files can contain a variety of functions and other data that can be compiled into (or interpreted as a computer program, library file, and the like. Document requirements can define particular features and/or content that a source code file needs to provide. Source code files can include references to other source code files and/or libraries such that multiple files can be used to compile and/or execute a program or programmatic library. Source code files can be stored using a version control system (or any other source code repository that provides a common database so that changes can be made to one or more source code files without propagating those changes to other devices until they obtain the appropriate version of the source code file from the source code repository. Source code files stored in a source code repository can be checked out by a particular computing device, which causes the computing device to store a copy of the source code file and allow changes to be made to the source code file. A checked out source code file can be checked in (e.g. committed to the source code repository, causing the locally stored source code file to be added to the source code repository. In several embodiments, metadata describing the file can also be added to the source code repository (and/or a bug tracking database when the file is checked in.

At step 312, commit history data can be obtained. The commit history data for a source code file can include a variety of metadata describing when a source code file was checked out from the source code repository, when the source code file was checked into the source code repository, an indication of changes made to the local source code file relative to the version of the source code file stored using the source code repository, a description of what changes were made and why those changes were made, the developer(s responsible for the changes made, a description of future changes to be made, links to a bug tracking database, and the like. A variety of processes for generating commit history data are described in more detail with respect to FIG. 4.

At step 314, quality metrics can be obtained. Quality metrics can include a variety of data indicating the quality of the processes used to develop the source code files and/or the developers developing the source code files. In many embodiments, the quality metrics include an indication of bugs previously present in the source code file, bugs that have been fixed in the source code file, and/or bugs still existing in the source code file. The quality metrics can also include a developer model indicating performance data regarding the developer who has checked out the source code file. A variety of processes for generating developer models are described with respect to FIG. 5.

At step 316, a document model can be determined. A document model can describe how a particular source code file is located within a source code repository along with the structure of the source code file itself. The document model can indicate how a source code file is linked to (e.g. referenced by other source code files within the source code repository, how the source code file is compiled and/or interpreted, the type of compiled product (e.g. executable file, library code, unit test, etc. generated based on the source code file, the number of lines of code in the source code file, functions provided by the source code file, variables used in the source code file, and the like.

At step 318, code hot spots can be determined. Code hot spots can indicate source code files that are subject to a large number of bugs and/or modifications, thereby indicating those source code files that are likely to cause problems within a code base. In several embodiments, code hot spots can indicate particular source code files that are subject to a large number of edits and/or frequent edits. For example, bugs can repeatedly arise in a particular source code file as developers try to resolve a bug over a number of check out and check ins. Code hot spots can indicate portions of code and/or issues that are resistant to unit testing and/or subject to bugs that only occur under a very specific set of conditions. A source code file can be determined to be a code hot spot based on the frequency of check outs and check ins, number of bugs associated with the source code file, skill of the developers working on the source code file, the structure of the source code file, the commit history for the source code file, and/or any other data associated with the source code file as appropriate. For example, if a source code file has several check in and check outs associated with the same (or related bugs, the source code file is likely a hot spot as the developers are struggling to resolve the bugs.

In several embodiments, code hot spots can be determined by calculating a score for each source code file within a source code repository, the score being calculated based on the frequency of check outs and check ins, number of bugs associated with the source code file, skill of the developers working on the source code file, the structure of the source code file, the commit history for the source code file, and/or any other data associated with the source code file. The source code files can be ranked based on their score. Those source code files with a score exceeding a threshold value can be indicated as code hot spots. The threshold value can be pre-determined and/or determined dynamically based on the calculated scores. In many embodiments, the scores can be calculated or determined using a machine learning classifier that has been trained to generate a score based on features including the structure of a source code file, frequency of check outs and check ins, number of bugs associated with the source code file, developers working on the source code file, and/or any other data associated with the source code file as appropriate. The machine learning classifier can also calculate a confidence metric that indicates the likelihood that the calculated score corresponds to the likelihood that the source code file is a code hot spot. A variety of machine learning classifiers can be utilized in accordance with aspects of the disclosure including, but not limited to, decision trees, k-nearest neighbors, support vector machines (SVM, neural networks (NN, recurrent neural networks (RNN, convolutional neural networks (CNN, and/or probabilistic neural networks (PNN in accordance with various aspects of the disclosure. RNNs can further include (but are not limited to fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine learning classifiers can be utilized. For example, specialized machine learning classifiers can be used for particular tasks when available and general machine learning classifiers can be used when specialized machine learning classifiers are unavailable can further increase the accuracy of predictions.

At step 320, predictive metrics can be calculated. Predictive metrics for a source code file can include an indication of the number of bugs expected to be associated with the source code file in the future. The predictive metrics can be determined based on the past number of bugs associated with the source code file, structure of the source code file, frequency of check outs and check ins, number of open bugs associated with the source code file, the skill of the developers working on the source code file, and/or any other data associated with the source code file as appropriate. In a variety of embodiments, predictive metrics can be calculated using one or more machine learning classifiers. The machine learning classifier can also calculate a confidence metric indicating the likelihood that the source code file will experience the predicted issues. For example, a machine learning classifier can calculate a number of bugs to occur in a source code file and a confidence metric that the calculated number of bugs will correspond to the actual number of bugs occurring in the source code file.

At step 322, notifications can be generated. The notifications can include an indication of source code files that have been identified as code hot spots and/or recommendations for particular developers to be assigned to maintain the source code file. For example, a source code file that is a source code hot spot can be assigned to an experienced developer and/or a developer that has experience in the types of bugs occurring (or predicted to occur within the source code file. The notifications can be provided to a variety of computing devices to alert developers of code hot spots and/or task assignments.

Generating History Data and Developer Models

Figure 4:
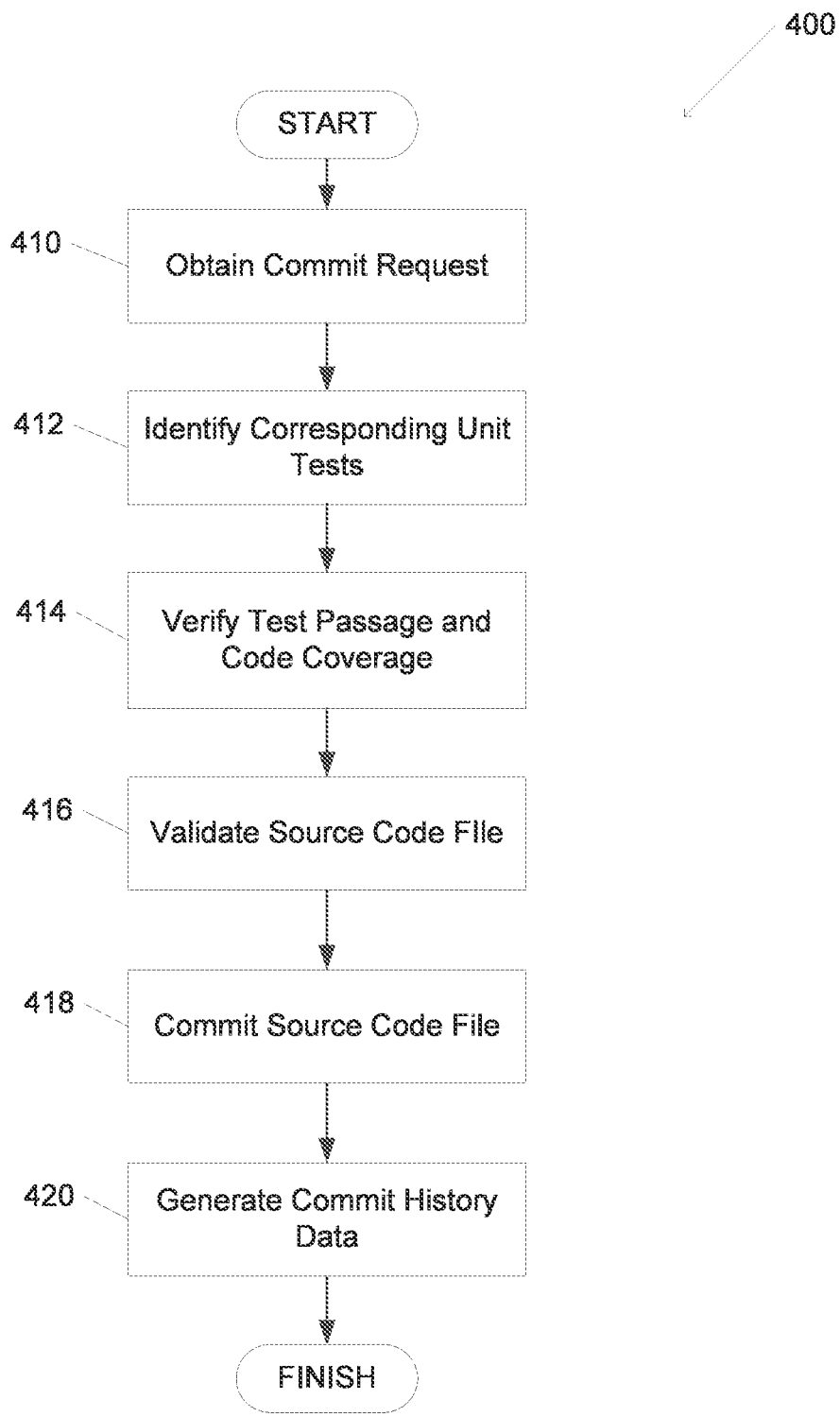
FIG. 4 is a flow chart conceptually illustrating a process for committing source code files in accordance with one or more aspects described herein.

FIG. 4 is a flow chart conceptually illustrating a process for committing source code files in accordance with one or more aspects described herein. Some or all of the steps of process 400 may be performed using one or more computing devices as described herein. In a variety of embodiments, some or all of the steps described below may be combined and/or divided into sub-steps as appropriate.

At step 410, a commit request can be obtained. A commit request can indicate a particular source code file that has been checked out from a source code repository is ready to be checked into the source code repository. The commit request can also indicate the time at which the commit request was created, an identification of the developer associated with the commit request, and/or metadata indicating data regarding changes to the source code file. The metadata can include developer comments, identification of bugs corrected in the changes, such as an identification number of the bug within a bug tracking database, and the like.

At step 412, corresponding unit tests can be identified. The unit tests can correspond to the source code files associated with the commit request. The unit tests can be developed to test the functionality of one or more functions defined within the source code file. The unit tests can test that a particular bug has been corrected in a source code file.

At step 414, test passage and code coverage can be determined. Unit tests can be executed against the source code file to determine if any bugs are present and/or particular bugs have been corrected in one or more functions. The unit tests can be considered to pass if all tests can be performed with no errors, while the unit test can be considered to fail if any of the functions return an error during any of the performed tests. Code coverage can be determined based on the number of functions present in the source code file that are executed by the unit tests and/or based on the number of lines of code that are performed during the execution of the unit tests. For example, a source code file may have 100 lines of code with an if statement, where a first 50 lines of code are executed if the if statement is true, and the second 50 lines of code are executed if the if statement is false. A unit test that only executes the true path of the if statement can have 100% coverage of the functions but only a 50% coverage of the lines of code. A unit test that executes both the true and false paths of the if statement would have 100% functional coverage and 100% code coverage. Test passage and/or code coverage may have a minimum standard threshold for acceptable coverage. For example, a suite of unit tests may only cover 75% of a document, while the corresponding coverage standard may be 95%.

At step 416, a source code file can be validated, Validating a source code file can include ensuring that all unit tests pass and/or that particular development processes have been followed. For example, development processes can require that unit tests be written to test for a particular bug before modifying a source code file to correct the bug. Validating a source code file can also include ensuring that particular standards, such as variable hardcoding, class names, rules, templates, design requirements, etc., are properly implemented. In several embodiments, validating a source code file includes compiling the source code file to ensure that the changes made to the source code file will not prevent other developers from successfully compiling the source code file once it is committed to the source code repository. In many embodiments, source code files may not be checked in (e.g. committed to a source code repository without being validated. In a number of embodiments, validating a source code file can include determining that the test passage rate and/or code coverage of the unit tests exceeds a threshold value.

At step 418, a source code file can be committed. Committing a source code file can include updating one or more source code files stored in a source code repository, generating a change document that can be applied to a source code file in the common database, merging a branch into its parent, and/or the like. Committing a source code file can also include generating a difference document, such as a redline document, that indicates the specific changes made between the version of the source code file being checked in and the version of the source code file currently stored in the source code database. In many embodiments, multiple developers can check a source code file out from a source code repository. This can lead to situations where a source code file being committed by a first developer has the effect of removing changes made by a second developer who checked the source code file out after the first developer and checked in the source code file before the first developer. These changes can be resolved manually and/or automatically by the source code repository depending on the particular source code repository used to store the source code files.

At step 420, commit history data can be generated. The commit history data for a source code file can include a variety of metadata describing when a source code file was checked out from the source code repository, when the source code file was checked into the source code repository, an indication of changes made to the local source code file relative to the version of the source code file stored using the source code repository, a description of what changes were made and why those changes were made, the developer(s responsible for the changes made, comments provided by the developer, links to one or more bugs stored in a bug tracking database, any changes made to the source code file (such as resolving check in conflicts to complete the commit process, and the like. The commit history data can be associated with the source code file such that some or all of the history of the development of the source code file can be reviewed and/or audited.

Figure 5:
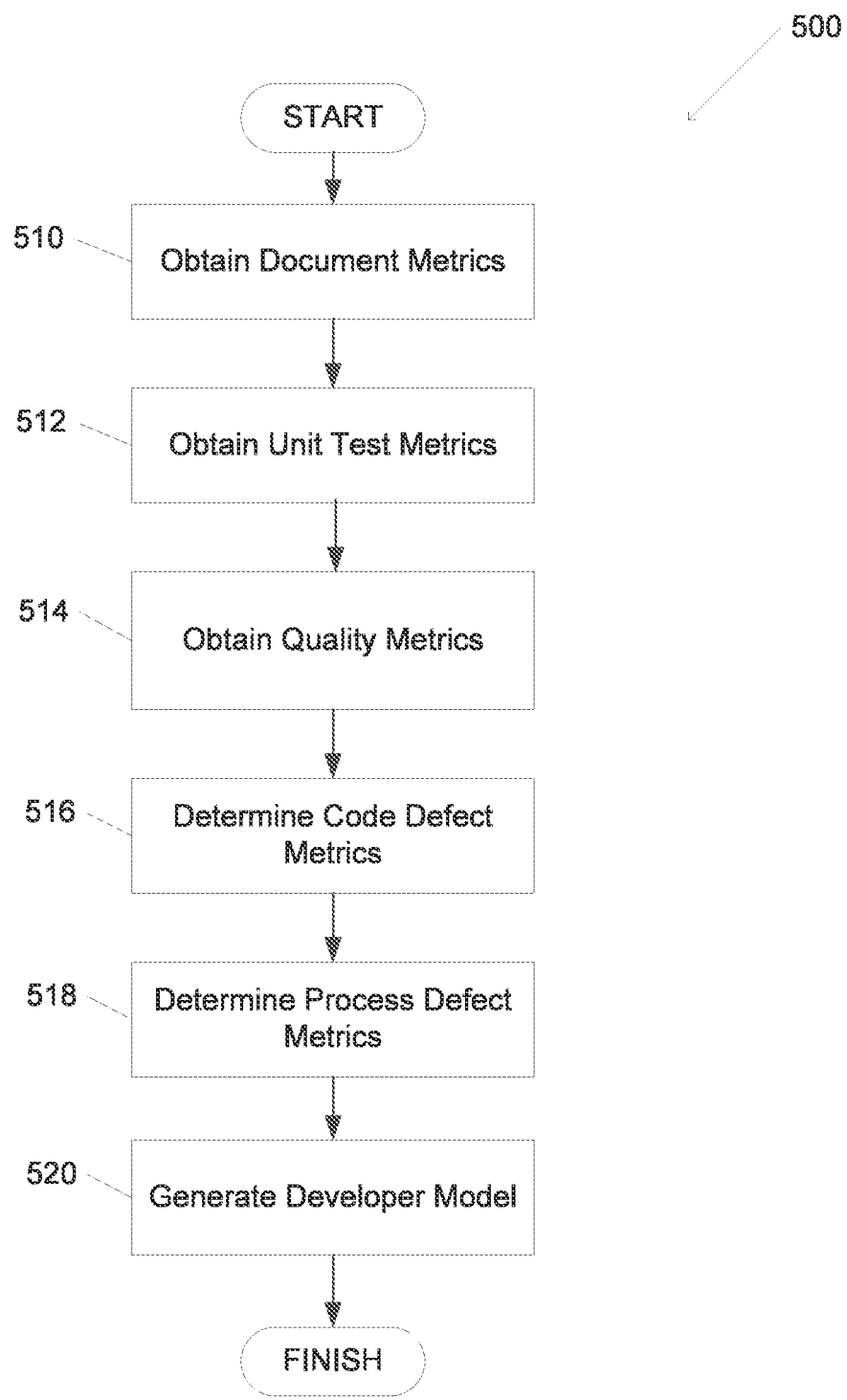
FIG. 5 is a flow chart conceptually illustrating a process for generating a developer model in accordance with one or more aspects described herein.

FIG. 5 is a flow chart conceptually illustrating a process for generating a developer model in accordance with one or more aspects described herein. Some or all of the steps of process 500 may be performed using one or more computing devices as described herein. In a variety of embodiments, some or all of the steps described below may be combined and/or divided into sub-steps as appropriate.

At step 510, document metrics can be obtained. Document metrics can include any variety of data describing a source code file, such as identification of corrected bugs, an identification of the developer(s that have edited the file, comments, lines of code, functions provided, linked libraries, references to other source code files, and the like as described herein.

At step 512, unit test metrics can be obtained. Unit test metrics can include the number of unit tests for a source code file, bugs tested by the unit tests, functional coverage of the source code file, code coverage for the source code file, number of tests that pass, and the like as described herein.

At step 514, quality metrics can be obtained. Quality metrics can include, but are not limited to, commits (e.g. check-in of source code files to a common database, trend reports, evolutionary information for the code, and the like. The determination of quality metrics can ensure that the source code file(s being committed have been developed according to the defined practices, have sufficient test coverage, and aspects of the code meet or exceed an expected code quality as described herein.

At step 516, code defect metrics can be determined. Code defect metrics include information describing the defects that exist in the code (e.g. bugs, defects that have been fixed in the code, coding errors made in the document (e.g. linter results and the like. Code defect metrics can be determined based on changes to a source code file, unit tests developed for the source code file, and/or lists of bugs for the source code file indicated in a bug tracking database. In several embodiments, code defects can be identified based on failed unit tests associated with the source code file.

At step 518, process defect metrics can be determined. Development processes can include a variety of requirements, such as the development of unit tests, when the unit tests need to be developed in the development process, minimum passage rates for code coverage and unit tests, an allocated time to have a file checked out, and the like. The process defect metrics can describe breakdowns in the development process, such as a failure to develop unit tests before documents, unit test coverage deficiencies, failure to adhere to document development standards, and the like.

At step 520, developer models can be generated. The developer model can describe how a developer develops unit tests, develops documents, errors likely to be made by the developer, and the like. The developer model may describe the developer with respect to an average model developer. Developer models can include performance metrics for developers and/or an indication of common errors made in the source code file and/or development process. In several embodiments, the developer model can be generated by machine learning classifiers utilizing a variety of rules and/or patterns to determine appropriate quality checks and identify potentially troublesome (or beneficial trends in the development process of a particular developer. The developer model can include a developer score indicating a measure of the developer's skill level. The developer scores can be used to determine how skilled (or unskilled a developer is relative to other developers. Machine learning classifiers can be trained on a dataset of common errors, positive developer attributes, curated example documents, etc. The trained machine learning classifiers can be used to generate the developer model and/or a confidence metric indicating the likelihood that the developer model accurately scores the developer's real world skill. The obtained document metrics, unit test metrics, quality metrics, and/or process defect metrics can be associated with commit information to identify when (and/or by whom defects were introduced into source code files.

Event Sequences

Figure 6:
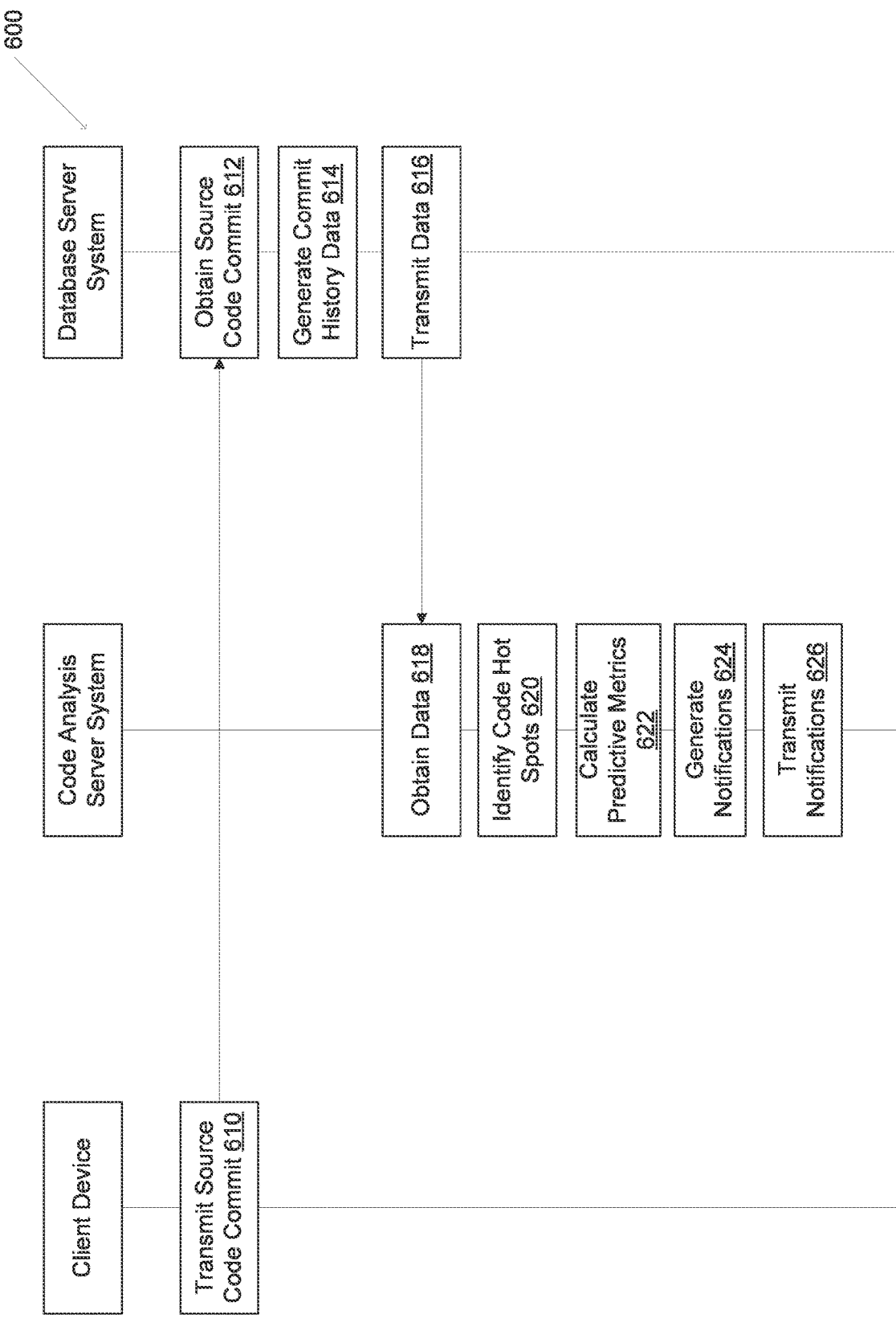
FIG. 6 is an event sequence conceptually illustrating the flow of data in an operating environment in accordance with one or more aspects described herein.

FIG. 6 is an event sequence conceptually illustrating the flow of data in an operating environment in accordance with one or more aspects described herein. Some or all of the steps of sequence 600 may be performed using one or more computing devices as described herein. In a variety of embodiments, some or all of the steps described below may be combined and/or divided into sub-steps as appropriate.

At step 610, a client device can transmit a source code commit. The client device can have previously checked out a source code file and performed a variety of modifications to the source code file. The source code commit can indicate at least one bug identifier identifying a bug fixed by the modifications to the source code file, the identification of the developer(s that checked out the source code file, the time the source code commit was requested, and/or any other information as described herein. In several embodiments, the source code commit is transmitted to a database server system hosting a source code repository storing the source code file. At step 612, a database server system can obtain a source code commit. The source code commit can be obtained from the client device.

At step 614, a database server system can generate commit history data. The commit history data can indicate when the source code file was checked out from the source code repository by the client device, when the source code commit was obtained, an indication of changes made to the source code file, a description of what changes were made and why those changes were made, the developer(s responsible for the changes made, comments provided by the developer, links to one or more bugs stored in a bug tracking database, any changes made to the source code file (such as resolving check in conflicts to complete the commit process, and the like. In many embodiments, the bug tracking database is maintained by the database server system.

At step 616, a database server system can transmit data to a code analysis server system. The data can include a variety of information for one or more source code files, such as document metrics, unit test metrics, quality metrics, code defect metrics, and/or process defect metrics. The data can also include one or more developer models indicating performance data for one or more developers that have modified any of the source code files. At step 618, a code analysis server system can obtain the data transmitted by the database server system.

At step 620, a code analysis server system can identify code hot spots. A source code file can be determined to be a code hot spot based on the frequency of check outs and check ins, number of bugs associated with the source code file, skill of the developers working on the source code file, the structure of the source code file, the commit history for the source code file, and/or any other data associated with the source code file as appropriate. In several embodiments, code hots spots can be determined by calculating a score for each source code file within a source code repository, the score being calculated based on the frequency of check outs and check ins, number of bugs associated with the source code file, skill of the developers working on the source code file, the structure of the source code file, the commit history for the source code file, and/or any other data associated with the source code file. The source code files can be ranked based on their score. Those source code files with a score exceeding a threshold value can be indicated as code hot spots. The threshold value can be pre-determined and/or determined dynamically based on the calculated scores. In many embodiments, the scores can be calculated and/or determined using a machine learning classifier that has been trained to generate a score based on features including the structure of a source code file, frequency of check outs and check ins, number of bugs associated with the source code file, developers working on the source code file, and/or any other data associated with the source code file as appropriate. The machine learning classifier can also calculate a confidence metric that indicates the likelihood that the calculated score corresponds to the likelihood that the source code file is a code hot spot.

At step 622, a code analysis server system can calculate predictive metrics. Predictive metrics for a source code file can include an indication of the number of bugs expected to be associated with the source code file in the future. The predictive metrics can be determined based on the past number of bugs associated with the source code file, structure of the source code file, frequency of check outs and check ins, number of open bugs associated with the source code file, the skill of the developers working on the source code file, and/or any other data associated with the source code file as appropriate. In a variety of embodiments, predictive metrics can be calculated using one or more machine learning classifiers. The machine learning classifier can also calculate or determine a confidence metric indicating the likelihood that the source code file will experience the predicted issues. For example, a machine learning classifier can calculate or determine a number of bugs to occur in a source code file and a confidence metric that the calculated or determined number of bugs will correspond to the actual number of bugs occurring in the source code file.

At step 624, a code analysis server system can generate notifications. The notifications can include an indication of source code files that have been identified as code hot spots and/or recommendations for particular developers to be assigned to maintain the source code file. For example, a source code file that is a source code hot spot can be assigned to an experienced developer and/or a developer that has experience in the types of bugs occurring (or predicted to occur within the source code file.

At step 626, a code analysis server system can transmit notifications. The notifications can be transmitted to a variety of computing devices to alert developers of code hot spots and/or task assignments. For example, the notifications can be transmitted to a client device to notify a developer that a particular source code file and/or bug has been assigned to the developer. Transmitting the notifications may cause the notifications to be displayed on a display of a computing device. In another example, the notifications can be transmitted to a database server system to be incorporated into the commit history data for the appropriate source code file(s.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA, and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures can be performed in other than the recited order, and that one or more steps illustrated can be optional in accordance with aspects of the disclosure. Further, one or more aspects described with respect to one figure or arrangement can be used in conjunction with other aspects associated with another figure or portion of the description.

Although the present invention has been described in certain specific aspects, many additional modifications and variations would be apparent to those skilled in the art. In particular, any of the various processes described above may be performed in alternative sequences and/or in parallel (on different computing devices in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

The invention claimed is:

1. A method for identifying code hot spots, comprising:
   obtaining, by a code analysis server system, a set of source code files, wherein commit history data for each source code file is obtained and comprises an indication of when the source code file was checked out, an indication of when the source code file was checked in, an indication of a developer checking out the source code file, and a reference to one or more bugs stored in a bug tracking database;
   obtaining, by the code analysis server system, at least one quality metric for each source code file in the set of source code files, wherein the quality metric for a source code file of the set of source code files comprises an indication of a developer that has modified the source code file and a developer model indicating a performance rating of the developer;
   determining, by the code analysis server system, a document model for each source code file in the set of source code files, the document model indicating relationships between the source code files in the set of source code files; and
   determining, by the code analysis server system, code hot spots in the set of source code files based on the document model and the at least one quality metric for each source code file, wherein each code hot spot indicates a particular source code file in the set of source code files.

2. The method of claim 1, wherein the document model further comprises unit test results for the corresponding source code file.

3. The method of claim 2, wherein the unit test results comprise an indication of code coverage for the corresponding source code file and an indication of test passage rate for each test in the unit test.

4. The method of claim 1, wherein the quality metric for a source code file of the set of source code files comprises an indication of the processes used to modify the source code file of the set of source code files.

5. The method of claim 1, wherein the quality metric for a source code file of the set of source code files comprises an indication of bugs previously present in the source code file, bugs that have been fixed in the source code file, and bugs still existing in the source code file.

6. The method of claim 5, further comprising:
   calculating, by the code analysis server system, a score for each source code file based on the number of bugs fixed in the source code file and the number of bugs still existing in the source code file; and
   determining, by the code analysis server system, that a source code file is a code hot spot based on the score for the source code file.

7. The method of claim 1, further comprising determining, by the code analysis server system, the code hot spots using a machine learning classifier.

8. A code analysis server system, comprising: a processor; and
   a memory in communication with the processor and storing instructions that, when executed by the processor, cause the code analysis server system to:
   obtain a set of source code files, each source code file in the set of source code files comprising a set of functions and a set of lines of code;
   obtain commit history data for each source code file in the set of source code files, wherein the commit history data indicates a change to at least one line of code in the set of lines of code for the corresponding source code file, wherein the commit history data for a source code file of the set of source code files comprises an indication of when the source code file was checked out, an indication of when the source code file was checked in, an indication of a developer checking out the source code file, and a reference to one or more bugs stored in a bug tracking database, and wherein a quality metric for each source code file of the set of source code files is obtained and comprises an indication of a developer that has modified the source code file and a developer model indicating a performance rating of the developer;
   determine a document model for each source code file of the set of source code files, the document model indicating relationships between the source code files in the set of source code files determined based on the set of functions and the set of lines of code for each source code file; and
   determine code hot spots in the set of source code files based on the document model and the commit history for each source code file, wherein a code hot spot indicates a particular source code file in the set of source code files.

9. The code analysis server system of claim 8, wherein the document model further comprises unit test results for the corresponding source code file.

10. The code analysis server system of claim 9, wherein the unit test results comprise an indication of code coverage for the corresponding source code file and an indication of test passage rate for each test in the unit test.

11. The code analysis server system of claim 8, wherein the quality metric for a source code file of the set of source code files comprises an indication of the processes used to modify the source code file.

12. The code analysis server system of claim 8, wherein the quality metric for a source code file of the set of source code files comprises an indication of bugs previously present in the source code file, bugs that have been fixed in the source code file, and bugs still existing in the source code file.

13. The code analysis server system of claim 8, wherein the instructions, when executed by the processor, further cause the code analysis server system to:
   calculate a score for each source code file based on the number of bugs fixed in each source code file and the number of bugs still existing in each source code file; and
   determine that a source code file of the set of source code files is a code hot spot based on the score for the source code file.

14. The code analysis server system of claim 8, wherein the instructions, when executed by the processor, further cause the code analysis server system to determine the code hot spots using a machine learning classifier.

15. A method for identifying code hot spots, comprising:
obtaining, by a code analysis server system, a set of source code files, each source code file in the set of source code files comprising a set of functions and a set of lines of code;
obtaining, by the code analysis server system, commit history data for each source code file of the set of source code files, the commit history data for each source code file of the set of source code files comprising an indication of when the source code file was checked out, an indication of when the source code file was checked in, an indication of a developer checking out the source code file, and a reference to one or more bugs stored in a bug tracking database;
obtaining, by the code analysis server system, quality metrics for each source code file, the quality metrics for each source code file comprising:
an indication of a developer that has modified the source code file and a developer model indicating a performance rating of the developer;
an indication of the processes used to modify the source code file; and
an indication of bugs previously present in the source code file, bugs that have been fixed in the source code file, and bugs still existing in the source code file
determining, by the code analysis server system, the developer model for each source code file of the set of source code files, the developer model further indicating relationships between the source code files in the set of source code files determined based on the set of functions and the set of lines of code for each source code file; and
determining, by the code analysis server system and using a machine learning classifier, code hot spots in the set of source code files based on the developer model for each source code file, wherein a code hot spot indicates a particular source code file in the set of source code files and comprises a score calculated based on the commit history data, the quality metrics, and the developer model.

16. The method of claim 15, wherein a notification is transmitted to a database server system configured to include the notification in the commit history data for the corresponding source code file.

* * * * *